United States Patent [19]

Schupp et al.

[11] Patent Number: 4,928,386
[45] Date of Patent: May 29, 1990

[54] MOUNTING ARRANGEMENT FOR THE AUTOMATIC ASSEMBLY OF AGGREGATES PREFABRICATED PARTS TO A CAR BODY FROM BELOW

[75] Inventors: Gerhard Schupp; Klaus Tscheschlok, both of Friedberg; Maischberger Johann, Dinkelscherben, all of Fed. Rep. of Germany

[73] Assignee: KUKA Schweissanlagen and Roboter GmbH, Augsburg, Fed. Rep. of Germany

[21] Appl. No.: 329,582

[22] Filed: Mar. 28, 1989

[30] Foreign Application Priority Data

Mar. 31, 1988 [DE] Fed. Rep. of Germany ..... 38011107

[51] Int. Cl.⁵ ............................................. B23P 19/04
[52] U.S. Cl. ........................................ 29/824; 29/822; 29/823; 29/721; 29/798; 29/33 P; 198/468.8; 108/138
[58] Field of Search ................. 29/709, 720, 721, 822, 29/823, 824, 798, 281.1, 33 P, 563; 198/468.8; 108/102, 137, 138

[56] References Cited

U.S. PATENT DOCUMENTS 4,643,630 2/1987 Shiiba et al. ................. 198/486.6 X
4,734,979 4/1988 Sakamoto et al. ................. 29/712 X

FOREIGN PATENT DOCUMENTS 92021 1/1983 European Pat. Off. .
138038 9/1984 European Pat. Off. .
3545449 6/1987 Fed. Rep. of Germany .
2602200 2/1988 France .
163774 8/1985 Japan .
2075437 11/1981 United Kingdom .
2114067 8/1983 United Kingdom .

*Primary Examiner*—Timothy V. Eley
*Assistant Examiner*—Frances Chin
*Attorney, Agent, or Firm*—McGlew & Tuttle

[57] ABSTRACT

The invention relates to a mounting device for the automatic assembly of prefabricated parts or such as aggregates to a car body from below. For this purpose the aggregates 14 are arranged centeredly, but removably on installation plates 12, which are mounted liftably and in the lifted position floatingly yielding on a mounting frame 9. The aggregates 14 are penetrated by vertical centering journals of the installation plates 12. The protruding part 24 of the centering journal 17 is tapered in its face region and serves to enter an assigned centering bore of the car body 1 while the mounting frame is lifted. As the installation plate 12 is mounted floatingly on the mounting frame 9 in this phase, the aggregate arranged on it moves automatically into an assembly position in which an automatic process can take place.

8 Claims, 5 Drawing Sheets

MOUNTING ARRANGEMENT FOR THE AUTOMATIC ASSEMBLY OF AGGREGATES PREFABRICATED PARTS TO A CAR BODY FROM BELOW

FIELD OF THE INVENTION

The invention relates to a mounting arrangement for the automatic assembly of prefabricated parts, subassemblies or the like (e.g. aggregates to a car body from below in an assembly station).

BACKGROUND OF THE INVENTION

German publication 35 45 449 describes such a mounting arrangement, comprising a suspension arrangement which centrically carries the car body. The arrangement is movably guided, centered in an assembly station and is arrestable. The suspension arrangement comprises a mounting frame with installation plates, the installation plates being arranged in parallel slidable with regard to the frame level. The height of the mounting frame is adjustable from below against the car body.

The aim of such mounting arrangement is usually to make the execution of the connection between car body and aggregates easy, speedy and safe.

According to the state of the art an assembly aid is required for automatic assembly of prefabricated parts. The device determines the position of the car body once it is arrested and arranges the aggregates accordingly. This assembly aid comprises a complicated detection- and adjustment mechanism, which has to be swivelled into the space between the car body and the aggregate to be connected to the car body. The detector part of this assembly aid scans a centering bore or a centering journal of the car body. By means of the suspension arrangement, the assembly aid transmits the movements it executes to reach the central position to a device which moves the floating aggregate a mounting frame (an installation plate) into the assembly position. At the assembly position the installation plate is arrested. Next the assembly aid has to be removed so that the centered aggregates can be lifted into the assembly position by means of a lifting movement of the mounting frame. In this assembly position the mounting frame and the suspension arrangement are interlocked, so that the connection of the aggregates can take place at a different location, to which the suspension gear has to be moved with the car body and the mounting frame.

SUMMARY OF THE INVENTION

The invention is based on the task of considerably reducing the complex efforts necessary to develop a mounting arrangement for the automatic assembly of prefabricated parts which has a simpler design and which allows for a faster centering and mounting than known arrangements and controls of known assembly aid devices.

According to the invention, an automatic mounting device is provided for assembling prefabricated parts to a car body. A mounting device includes a suspension means for carrying a car body from a first location to a centered location at an assembly station. A mounting frame is provided at the assembly station at the centered location. A mounting frame carries installation plates which are arranged in parallel horizontally slidable with respect to the mounting frame. The mounting frame is adjustable horizontally to move against a bottom part of the car body. The installation plates are liftable from a first pre-centered position with respect to the mounting frame to a second floating position allowing limited floating movement of the installation plates relative to the mounting frame. The prefabricated parts are arranged on the installation plates. A vertical centering journal is provided connected to each installation plate. The prefabricated parts are provided with an alignment bore for receiving a corresponding one of the vertical centering journals. Vertical centering journals protrude beyond the corresponding alignment bore after being received by the alignment bore. Centering bores are formed at the bottom part of the car body for receiving the portion of the vertical centering journal which protrudes beyond the corresponding alignment bore. The prefabricated parts are automatically aligned in an assembly position by means of the floating movement of the installation plates upon horizontal movement of the mounting frame toward the car body.

The arrangement of the present invention does not use the specific assembly aid the prior art. Instead, a single aggregate is arranged centered, but removable on an assigned installation plate. A centering means is provided, used at the same time, for the centering of the aggregate with regard to the car body. The only prerequisite for this is that the installation plate can be lifted and lowered with regard to the mounting frame and that it can be floatingly moved relative and parallel to the frame level. No exact alignment of the centering journals with regard to the centering bores takes place while the mounting frame is lifted. The exact alignment is effected when the centering journals slide into the centering bores. The resulting sliding movements can be executed without inhibition due to the floating bearings of the installation plates. Once the aligned connection points are screwed together, the installation plates (the mounting frame connected to the installation plates) can be lowered, the centering journals sliding effortlessly out of the centering bores of the car body.

The lifting movement of the pre-fabricated parts or aggregate takes place in two stages. First the installation plate is lifted relative to the mounting frame such that the installation plate is in a floating position. Then the mounting frame and the installation plates are moved into the assembly position. These features allow for the lifting of the mounting frame and the lifting movement of the installation plates independent thereof by means of a single lifting device.

The invention also includes a special screw driver arrangement which can follow the relative movements of installation plates and mounting frame and which also allows for the insertion of the bolts in the respective continuous bores of the aggregates before the lifting and centering process takes place.

The invention also includes with a simple interlocking means which allows for the bracing of the lifted mounting frame on the suspension gear independent of the centering of the aggregates on the car body.

The various features of novelty which characterize the invention are pointed out with particularity in the claims annexed to and forming a part of this disclosure. For a better understanding of the invention, its operating advantages and specific objects obtained by its uses, reference is made to the accompanying drawings and descriptive matter in which a preferred embodiment of the invention is illustrated.

DESCRIPTION OF THE PREFERRED EMBODIMENTS

Figure 1:
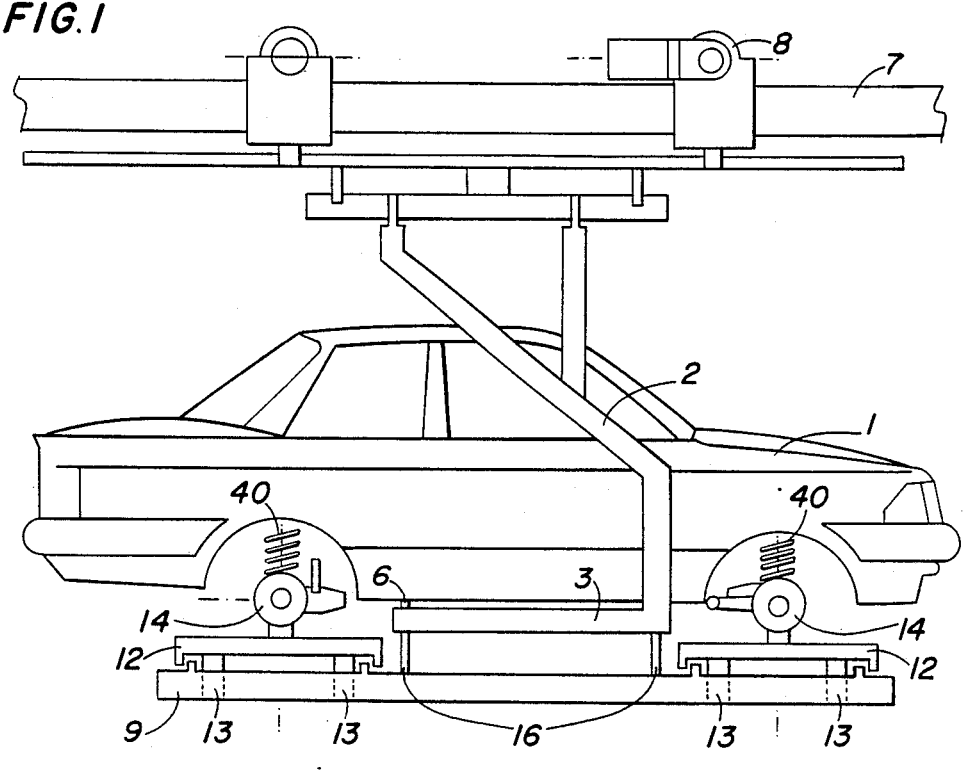
FIG. 1 is a lateral view of a car body centered in a suspension arrangement according to the invention, with a mounting frame in the lifted position.

Referring to the drawings in particular, the invention embodied therein includes an automatic mounting device for assembling prefabricated parts or aggregates to a car body 1. Suspension means or a suspension device 2 is provided for carrying the car body 1 from a first location to a centered location at an assembly station. A mounting frame 9 is positioned at the assembly station. The mounting frame 9 carries installation plates 12. The mounting frame 9 is adjustable horizontally to move against a bottom part of the car body 1. The installation plates 12 are liftable from a first pre-centered position (see FIG. 4) to a second floating position (see FIG. 5), allowing limited floating movement with respect to the mounting frame. The prefabricated parts 14 are arranged o the installation plates 12. A vertical centering journal 24 is provided and connected to each installation plate 12. The prefabricated parts 14 include alignment bores for receiving a corresponding vertical centering journal 22. A centering bore 23 is provided at the bottom of the car body 1 for receiving a portion of the vertical centering bore 17 which protrudes beyond the corresponding alignment bore of the prefabricated parts or aggregates 14. The pre-fabricated parts are automatically aligned in an assembly position by means of the floating movement of the installation plates 12 upon horizontal movement of the mounting frame 9 toward the car body 1.

Figure 2:
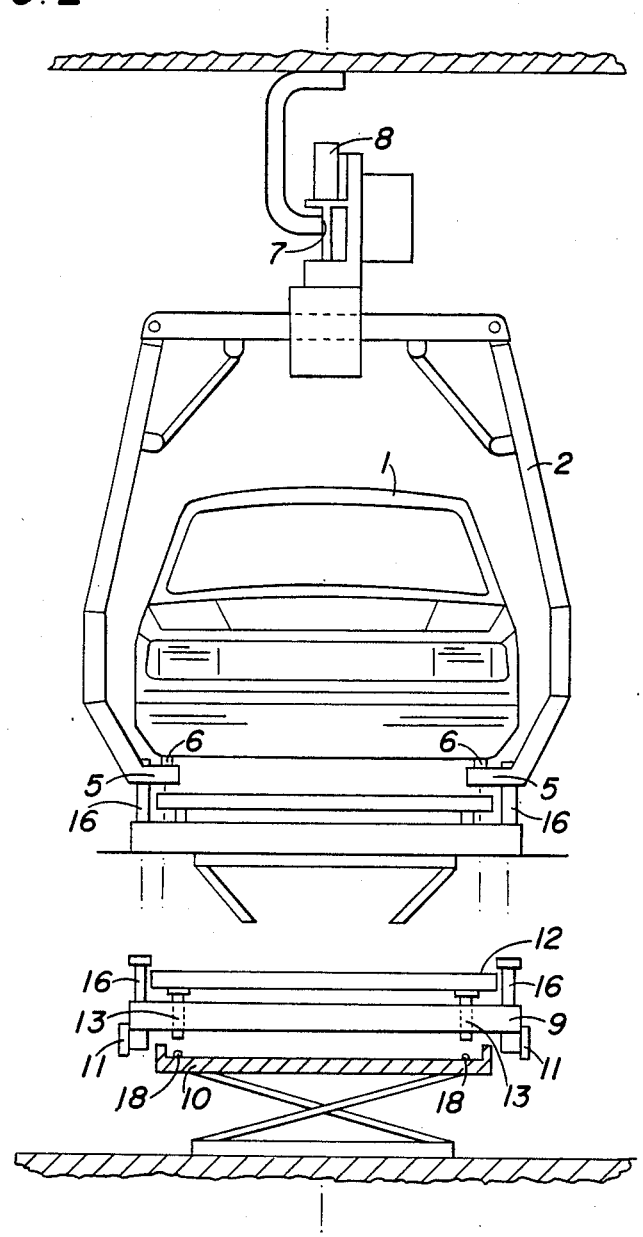
FIG. 2A is a front view of the arrangement according to FIG. 1 showing a lifted position of the mounting frame.
FIG. 2B is a front view of the arrangement according to FIG. 1 showing a lowered position of the mounting frame.

The mounting arrangement in FIG. 1 and 2 shows the suspension device 2, which can be moved along a rail 7 by means of a running gear 8. In the suspension device 2 the car body 1 is arranged and centered. For this purpose arms 5 are provided bending inward from each yoke 3 of the suspension device 2. The arms 5 have centering elements 6 engaging with matching centering bores of the car body 1. Herein it is advantageous to execute two out of four centering bores as long holes. The car body 1 centered in the suspension device 2 as discussed above is centered and arrested in the assembly station.

The various prefabricated parts, subassemblies or more generally aggregates 14 are to be moved to the ca body 1 from below by means of a mounting frame in a manner appropriate for assembly and then mounted. For this purpose a mounting frame 9 is provided which can be approached by means of a roller table. A lifting device 10 arranged below the mounting frame is designed so that it can lift the mounting frame 9. The installation plates 12 are mounted to the mounting frame 9 as are the aggregates 14, in a centered position ready for connection with the car body 1 by means of bolts. The form and arrangement of the installation plate 12 can be seen in FIG. 4 and 5.

Figure 3:
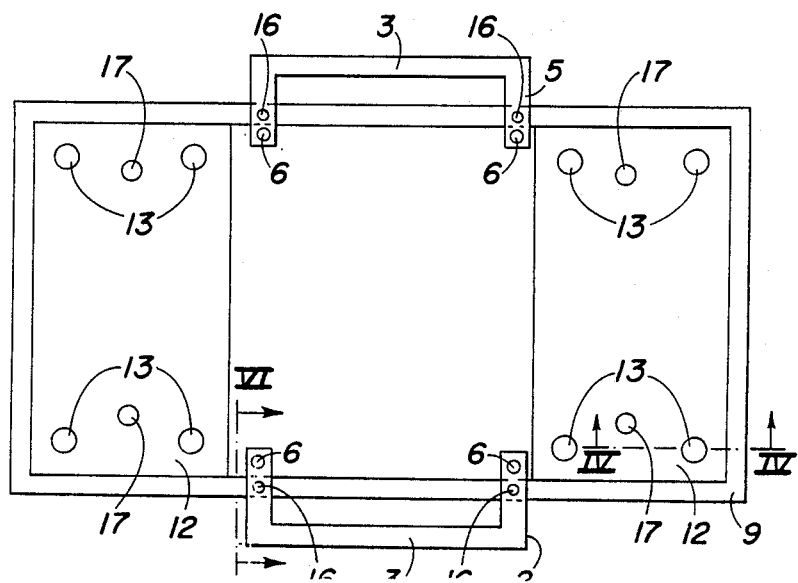
FIG. 3 is a top view of a mounting frame showing cooperating installation plates.
Figure 4:
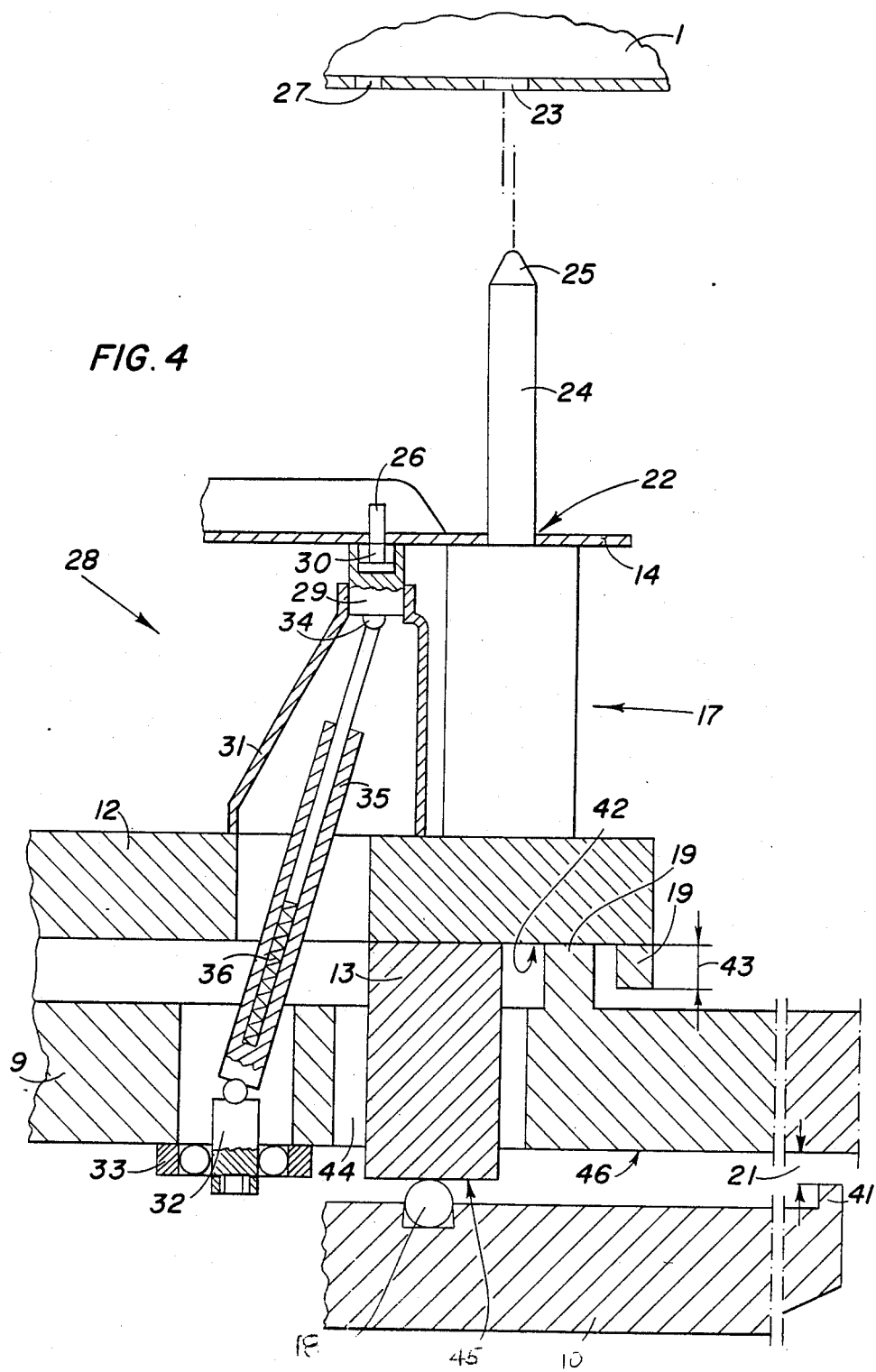
FIGS. 4 and 5 are vertical cross sectional views taken in the direction of line IV—IV of FIG. 3 through a centering point of the installation plate shown in various positions; and, FIG. 6 is a vertical cross sectional view through an interlocking region between the suspension gear and the mounting taken in the direction of line VI —VI of FIG. 3.
Figure 5:
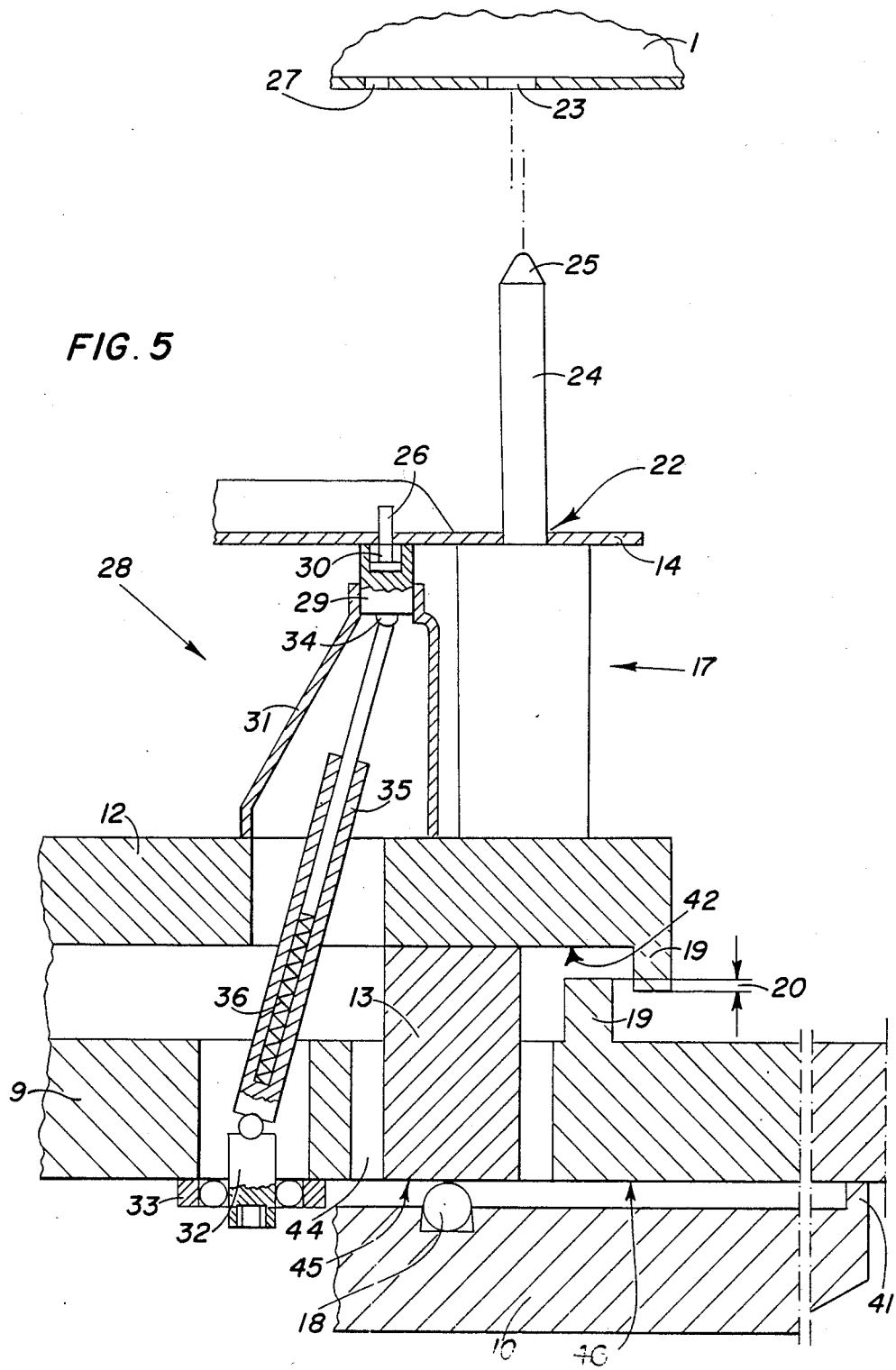

FIG. 3 is a top view of the mounting frame 9 having two installation plates 12 in a simplified representation, which indicates the position of the various centering and connection means with the help of the sections IV—IV and VI—VI(see FIGS. 4 and 5). Herein each installation plate 12 has two centering journals 17 serving for the desired positioning of the aggregates 14 on the installation plates 12 (see FIG. 4). The suspension device 2 with the yoke 3 can be connected to the mounting frame 9 by means of locking bolts 16 (see FIG. 6).

FIGS. 4 and 5 show vertical centering journals 17 on the various installation plates 12, which enter a bore 22 in the aggregate 14 and which have a centering journal part 24 protruding from the bore 22. The centering journal part 24 has a tapering 25 designed to enter a centering bore 23 on the bottom side of the car body 1, even if the axes of said centering bore 23 and of the protruding centering journal part 24 are not aligned. By means of these centering journal parts 24 and the bores 22 in the aggregate 14 the aggregate 14 is arranged on the installation plates 12 in a centered manner.

In the basic position of the installation plate 12 according to FIG. 4 it is positioned with its bottom surface 42 on a shoulder 19 of the mounting frame 9. Each journal 13, connected to the installation plate 12, enters a bore 44 of the mounting frame 9 and its bottom surface 45 protrudes over a bottom surface 46 of the mounting frame 9.

The bottom surface 45 of the journal 13 meets a floating bearing 18 arranged on the upside of the lifting device 10.

When the lifting device 10 is moved upward from the position in FIG. 4, the floating bearing 18 lifts the journal 13 of the installation plate 12. Thus the bottom surface 42 of the installation plate 12 is freed from the shoulder 19, as is shown in FIG. 5. In this position the friction between the shoulder 19 and the bottom surface 42 is eliminated, so that now the installation plate 12 is floatingly movable parallel with regard to the mounting frame 9 within a certain range.

The floating mounting of the installation plate 12 is required to achieve a perfect entering of the tapering 25 of the protruding centering journal part 24 into the centering bore 23 of the car body 1 when the lifting device 10, which now also moves the mounting frame upward by means of the web 41 moves further upward. It has to be assumed that the axe of these bores 23 and of the centering journals 24 are not aligned at the beginning of the lifting movement, as shown in FIG. 4 and 5. By means of the eccentric entering of the tapering 25 into the bore 23 the centering journal part 24 is forced to yield laterally until the aligned position of said axes is achieved.

The entire installation plate 12 and with it the aggregate 14 fixed on it by means of centering journals 17, 24 follow the lateral yielding movement during the lifting, with the result that the bolt 26 is perfectly aligned with the assigned bore 27.

In order to secure the described process of alignment of the aggregate 14 during the lifting movement of the lifting device 10, several prerequisites have to be met in FIG. 4 and 5.

First of all, it has to be taken care that the installation plate 12 has a pre-centered position with regard to the mounting frame in FIG. 4, as during the lifting of the mounting frame 9 the tapering 25 of the centering journal part 24 has to meet at least the edge of the bore 23. The pre-centering is achieved because the locking bolts 16 (see FIG. 2) of the mounting frame 9 engage with matching bores in the suspension gear 2 in which the car body is led centrically and also because the movability of the installation plate 12 on the mounting frame 9 is limited by the overlapping catches 19 or shoulders. The horizontal distance between the catches or shoulders 19 is no larger than the maximal transverse offset of the axes of the bore 23 and the centering journal part 24 possible. The play between the bore 44 of the mounting frame 9 and the journal 13 of the installation plate 12 is calibrated accordingly.

The relative lifting movement of the installation plate 12 with regard to the mounting frame 9 is limited. It has to be guaranteed that the lifted installation plate 12 cannot move floatingly at random as long as the centering journal 17, 24 has not entered the bore 23. In the embodiment according to FIG. 4 and this is achieved by making the distance 21 between the web 41 of the lifting device 10 and the bottom surface 46 of the mounting frame 9 smaller than the distance 43 between the faces of the catches 19 in the basic position according to FIG. 4, the distance 21 being based on a position in which according to FIG. 4 the floating bearing 18 has just gained contact with the bottom surface 45 of the journal 13.

As shown in FIG. 5, the catches 19 overlap in the lifted position of the installation plate 12 by the overlap 20, thus limiting the lateral floating movement of the installation plate 12 in the lifted position.

Furthermore, in the representation according to FIG. 4 it can be seen that the protruding centering journal part 24 also protrudes beyond the bolt 26 so that the centering of the aggregate 14 is executed before the bolts 26 can engage with the bores 27. Also, according to FIG. 4 and 5 one screwdriver arrangement 28 is provided per bolt site 26, each of said screwdriver arrangements being able to follow the sliding movements of the installation plate 12.

Each bolt 26 enters a respective bore in the aggregate 14. Its head sits in the reception 30 of a screw nut 29 which is guided in support 31 of the installation plate 12. By means of an articulation 34 the rod of a telescopic arrangement 35 is engaged. The rods of the telescopic arrangement 35 with their articulations are extended by a pressure spring providing them with a bias. The bottom articulation 34 sits on a screw driver nut 32 which itself is guided in a support 33 on the mounting frame 9. Thus an appropriate drive can actuate the screwdriver nut 32 from below regardless of the position of the screw nut 29 depending on the movability of the installation plate 12. A prerequisite for this is that the mounting frame 9 is connected to the suspension device 2 in an appropriate manner and that it can be moved to the respective station by means of this suspension device 2.

Figure 6:
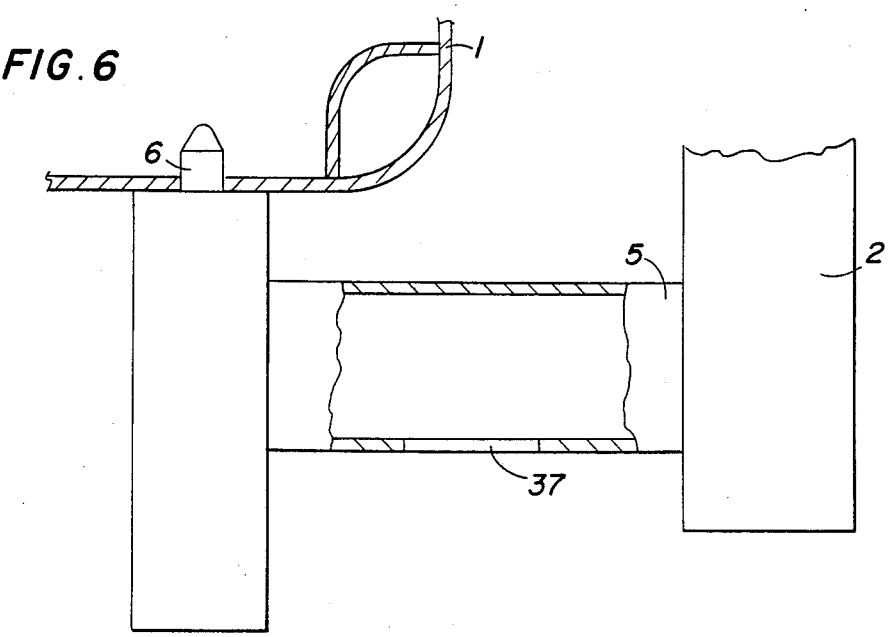
FIG. 6a is a vertical cross sectional view of a locking bolt.
FIG. 6b is a top view of the interlocking region.
Figure 6A:
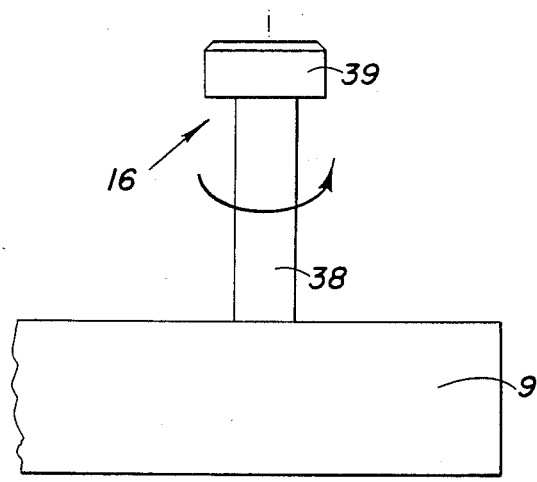
Figure 6B:
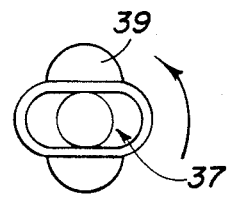

An appropriate locking device for this purpose is represented in FIG. 6. It can be seen that the centering 6 for the car body 1 on the suspension device 2 as well as the locking of the mounting frame 9 with regard to the suspension device 2 is executed on the arm 5 of the suspension device 2. For this purpose the arm 5 is hollow and its bottom wall has an oblong hole 37 in FIG. 6b. A locking bolt 16, 38 with a salient head is provided in the corresponding place on the mounting frame 9 in FIG. 6a, so that during the lifting of the mounting frame 9 the head 39 is guided through the oblong hole. The locking bolt 38 is mounted rotatably adjustable on the mounting frame 9. A rotation of the salient head 39 of 90° results in the locking of the locking bolt 38 on the arm 5.

FIG. 1 shows that the lifting of the mounting frame 9 into the assembly position of the aggregates 14. This lifting takes place against the bias of aggregate pressure springs 40, which, as a rule, are present in the execution of the aggregates in the form of front wheel axle and rear wheel axle. This lifting movement leads to the bracing of the springs 40. The screwing usually takes place with a bias of the springs corresponding to the loading the finished motor vehicle with two persons.

Once the locking shown in FIG. 6 has taken place, the lifting device can be moved back to its starting position according to FIG. 2. Then the bias of the springs 40 ensure that the salient heads 39 of the locking bolts are braced fastened with regard to the surface of the inner wall of the arm 5. Therefore, each installation plate 12 can return to its bottom basic position when the lifting device 10 is lowered without any changes in the centering of the aggregate 14. The bolts 26 remain in their ready position, in which they are held by means of the pressure spring 36.

While a specific embodiment of the invention has been shown and described in detail to illustrate the application of the principles of the invention, it will be understood that the invention may be embodied otherwise without departing from such principles.

What is claimed:

1. An automatic mounting device for assembling prefabricated parts to a car body, comprising:
   suspension means for carrying a car body from a first location to a centered location at an assembly station;
   a mounting frame positioned at the assembly station, said mounting frame carrying installation plates arranged substantially in parallel with respect to each other, said installation plates being slidable with respect to the mounting frame, said mounting frame being adjustable to move against a bottom part of the car body, said installation plates being liftable from a first precentered position with respect to the mounting frame, to a second floating position allowing limited floating movement with respect to the mounting frame, the prefabricated parts being arranged on the installation plates;
   a vertical centering journal connected to each installation plate, the prefabricated parts having alignment bores for receiving the corresponding vertical centering journal, each said vertical centering journal protruding beyond the corresponding alignment bore;
   centering bores formed at a bottom part of the car body for receiving the portion of the vertical centering journal protruding beyond the corresponding alignment bore, the prefabricated parts being automatically aligned in an assembly position by means of the floating movement of the installation plates upon movement of the mounting frame toward the car body.

2. An automobile mounting device according to claim 1, wherein the prefabricated parts mounted on the installation plate are moved in two stages, the first stage including movement of the installation plate relative to the mounting frame and the second stage including the movement of the mounting frame and the installation plate.

3. An automatic mounting device mounting device according to claim 1, further comprising a lifting device for lifting the mounting frame relative to the car body, said installation plate being arranged on journals extending through the mounting frame, bearings being provided between the journals and the lifting device for floating mobility of the installation plates upon lifting by the lifting device.

4. An automatic mounting device according to claim 1 wherein each of the installation plates and the mounting frame includes lateral shoulders which overlap in a lifted position providing play for floating of the installation plate with respect to the mounting frame from the pre-centered position.

5. An automatic mounting device according to claim 1, wherein each installation plate and the mounting frame have support elements for supporting a spring biased telescopic screwdriver arrangement.

6. An automatic mounting device according to claim 5, wherein both alignment bores are provided in the prefabricated parts, the screwdriver arrangement being aligned with said bolt holes.

7. An automatic mounting device according to claim 5, wherein said screwdriver arrangement includes a screw nut rotatably mounted on the installation plate said screw nut for receiving a bolt head, a screwdriver nut mounted in the mounting frame and articulated spring-biased telescopic portion and a rotationally rigid connection associated with the nuts.

8. An automatic mounting device according to claim 1, wherein said suspension means includes tube-shaped arms provided with an oblong hole, said mounting frame having rotatably adjustable locking bolts each locking bolt of said locking bolts being adapted to enter a corresponding said oblong hole for connection with the tube-shaped arms.

* * * * *